3,148,952
COMPOSITE METALLIC BODY AND METHOD OF PREPARATION
George S. Foerster and Russell E. Matthews, Midland, Mich., assignors to The Dow Chemical Company, Midland, Mich., a corporation of Delaware
No Drawing. Filed Oct. 18, 1961, Ser. No. 146,008
7 Claims. (Cl. 29—183.5)

This invention relates to a composite metal body and more particularly is concerned with aluminum clad magnesium fabrications having an interlayer of magnesium-cadmium alloy as bonding agent.

Various methods have been proposed for bonding together aluminum and magnesium but these have not met with any great success. One of these is the direct bonding of the two metals. However, the metal diffusion that occurs between magnesium and aluminum at processing temperatures as low as 400° F. produces brittle magnesium-aluminum intermetallic compound. The presence of this brittle compound renders the composite body unsuitable for most applications, severely limits the amount of working that can be carried out on the laminated article and adversely affects the bond. At higher temperatures, e.g. 600–650° F., as are ordinarily employed in roll cladding aluminum to magnesium for example, formation of the undesirable brittle intermetallic compound is very rapid. Other methods propose the use of zinc, cadmium, lead and alloys such as zinc-cadmium and aluminum-zinc as bonding agents for the composite. With many of these agents there also is formation of undesirable brittle intermetallic compound. Others, such as the relatively low-melting cadmium or lead, become fluid at the elevated temperatures employed in working magnesium and bonding is lost as the layers of the composite readily slip and tear during the working operations.

Now unexpectedly it has been found that the disadvantages accompanying the processes and techniques ordinarily employed in bonding aluminum to magnesium can be overcome and undesirable brittle compound formation in the interface can essentially be eliminated at elevated temperatures normally employed for hot working magnesium if specific magnesium-cadmium binary alloys are used as bonding agents for magnesium-aluminum laminates.

It is a principal object of the present invention to provide a bonding agent for use in preparing magnesium-aluminum composites which agent inhibits growth of brittle compounds between the contacting faces of the metal layers while the composite laminated article is being formed at elevated working temperatures.

It is another object of the present invention to provide a bonding agent for cladding aluminum to magnesium which can be used at elevated processing temperatures normally employed in the hot working of magnesium.

It is a further object of the present invention to provide an aluminum clad magnesium laminate wherein the cladding material is firmly bonded to the magnesium and which laminate exhibits both a good minimum bend radius and desirable working characteristics.

It is an additional object of the present invention to provide light-weight clad articles having good strength properties and a high resistance to corrosion.

It is another object of the present invention to provide an improved method for fabricating composite articles of magnesium and aluminum in which the core and cladding metal are held together through a strong, ductile bonding interlayer of magnesium-cadmium alloy.

These and other objects and advantages will be apparent from the detailed description present hereinafter.

The composite laminated fabrication of the present invention comprises a magnesium base and an outside layer of aluminum, these being joined through a thin coating of a magnesium-cadmium binary bonding agent. The term magnesium as used herein with reference to the material to be clad is defined as those metals containing at least about 70 weight percent magnesium. Preferably high purity aluminum will be employed as the exterior cladding material although aluminum base metals containing at least about 70 weight percent aluminum are suitable for use in the fabrications.

The magnesium-cadmium binary alloy utilized as bonding agent will contain from about 5 to about 90 atomic percent cadmium. Preferably magnesium-cadmium binaries containing from about 20 to about 75 atomic percent cadmium will be employed. Desirably about a 50–50 atomic percent binary alloy will be used. Unexpectedly, use of these particular alloys effectively prevents formation of undesirable brittle compounds in the bonding interlayer or on the mating surfaces of the composite product at the elevated temperatures over the times ordinarily employed for metal fabrication, e.g. hot rolling. Also with these particular binaries as an interlayer, working of the metal can be carried out at conventional elevated working temperatures.

The initial thickness of the magnesium-cadmium layer to be placed on the magnesium core can vary over a wide range, e.g. from about 0.0005 inch to about 0.005 inch or more. Ordinarily an interface having a minimum thickness of about 0.001 inch will be employed. The optimum magnesium-cadmium interface thickness to be used for a given cladding operation will depend on the amount of subsequent working, e.g. rolling, and subsequent heat treatments to be given to the laminated fabrication.

In carrying out the cladding process of the instant invention, a magnesium matrix is coated with a specified magnesium-cadmium alloy. This application can be made to one side of a sheet for example, or both sides can be treated. With other shaped articles, the articles can be completely or partially clad. Roll cladding, dipping the magnesium core into a bath of molten magnesium-cadmium alloy, spraying the alloy onto the magnesium surface, coating the magnesium core with cadmium or electrodepositing cadmium on the core followed by heat treating to form the desired magnesium-cadmium alloy are illustrative ways of producing the magnesium-cadmium interface. The aluminum cladding material then is attached to the core through the bonding interface utilizing the same operational techniques as described for the magnesium-cadmium layer. In carrying out the operation, mating metal surfaces should be clean and preferably be protected from oxidation during heating. Desirably, with roll cladding operations, heavy reductions are taken on the initial passes to facilitate bonding.

The composite fabrications of the instant invention are suitable for use in many operations where the high strength properties and light weight of magnesium are desired along with the corrosion resistance of aluminum. Aluminum clad magnesium sheet or other articles, for example, can be used in sea water, salt, or, acidic media where magnesium itself undergoes rapid corrosion. Aluminum clad magnesium plate offers the advantage of light weight and high strength along with the corrosion resistance of heavier all-aluminum plate.

Alternatively, if desired, an aluminum core can be clad with magnesium using the magnesium-cadmium alloy bonding agents of the instant invention. Also, the bonding agent can be first affixed to the aluminum and the resulting composite then be joined to the magnesium.

The following examples will serve to further illustrate the present invention but are not meant to limit it thereto.

EXAMPLE 1

Composite magnesium-aluminum articles, with or without a bonding layer of magnesium-cadmium alloy, were prepared according to the following procedure.

A.S.T.M. designated AZ31B alloy sheets, 4 by 8 by 0.5 inch thick were sanded and subsequently cleaned by immersion in perchloroethylene. (The AZ31B alloy has a nominal composition of 3 percent aluminum, 0.4 percent manganese, 1 percent zinc and balance magnesium.)

A number of magnesium-cadmium binary alloy melts were prepared. These melts were cast into slabs (4 inches by 4 inches by 1 inch thick), the slabs scalped to about 0.875 inch thickness and rolled at 650° F. into 0.018 inch thick sheet in multiple passes.

The resulting magnesium-cadmium sheets were sanded and cleaned in perchloroethylene.

High purity aluminum (99.99 percent aluminum) cladding material also was cleaned in a similar manner.

The magnesium and magnesium-cadmium alloy were joined by heating at a temperature of about 650 or 900° F. in air, the low temperatures being employed for the high cadmium containing binaries and the high temperatures for the high magnesium binary alloys. After heating to the predetermined temperature these sheets were roll bonded by passing through a rolling mill wherein the overall thickness of the composite was reduced about 45 percent. The exposed surface of the magnesium-magnesium cadmium two layer composite was cleaned as described hereinbefore. The aluminum was then bonded to the magnesium-cadmium surface by heating both sheets to about 600° F. and rolling to give about a 40 percent reduction in thickness. The resulting laminates prepared using magnesium-cadmium binaries containing more than about 20 atomic weight percent cadmium exhibited excellent bonding of the aluminum and magnesium. A sample of the resulting aluminum clad magnesium article utilizing a Mg–47 atomic percent cadmium interface was annealed at 550° F. for ½ hour and the minimum bend radius of this composite measured at room temperature and at 500° F. At room temperature the minimum bend radius was 3.9–4.9t and at the elevated temperature it was 2–2.9t. Bends made at both temperatures indicated no loosening of the bond between the cladding and the magnesium alloy core.

A number of composites were heated in air at 500 or 600° F. for periods of time ranging from about 1 to about 24 hours and the amount of brittle magnesium-aluminum compound formed in the interface was determined by metallographic means. The results of this study are presented in Table 1. These latter tests particularly show the effectiveness of the specific magnesium-cadmium binary alloy bonding agent in reducing the undesirable brittle compound formation even at fairly long exposure times of several hours or more, which times are considerably longer than would be necessary in actual fabricating operations.

*Table I*

| Run No. | Composite Laminate | Time of Heating—Hours | | | | | |
|---|---|---|---|---|---|---|---|
| | | 1 | 2 | 4 | 8 | 16 | 24 |
| | | Thickness of Brittle Compound Formed—Inch | | | | | |
| 500° F. | | | | | | | |
| 1 | Mg+Al | .0018 | .002 | .002 | .002 | .002 | .002 |
| 2 | Mg+95:5 MgCd[1]+Al | .0002 | .0004 | .0006 | .0008 | .0012 | .0016 |
| 3 | Mg+53:47 MgCd[1]+Al | .0002 | .0002 | .0002 | .0004 | .0004 | .0005 |
| 600° F. | | | | | | | |
| 4 | Mg+Al | .0018 | .0018 | .002 | .0024 | .0034 | [2].0036 |
| 5 | Mg+95:5 MgCd[1]+Al | .0008 | .0015 | .0016 | .0020 | .0030 | .0040 |
| 6 | Mg+53:47 MgCd[1]+Al | .0002 | .0002 | .0005 | .0010 | .0016 | .0020 |

[1] Expressed in atomic percent.
[2] Essentially all of Al consumed.

EXAMPLE 2

A number of tests were run to determine the amount of brittle compound formed by diffusion between aluminum and magnesium-cadmium binaries. In carrying out these studies a number of magnesium-cadmium alloys were rolled to a thickness of about 0.20 inch. The resulting sheets were clad to 0.01 inch thick aluminum by upsetting the composite 50 percent in a forging press. The laminates then were heated in air for various times either at 500 or 600° F. and examined metallographically for compound formation.

Table II which follows summarizes the results of this test in which unexpectedly small amounts of brittle compound were formed even when using magnesium-cadmium alloys containing relatively large amounts of magnesium.

*Table II*

| Run No. | Composite Laminate | Time of Heatings—Hours | | | | | |
|---|---|---|---|---|---|---|---|
| | | 1 | 2 | 4 | 8 | 16 | 25 |
| | | Thickness of Brittle Compound Formed—Inch | | | | | |
| 500° F. | | | | | | | |
| 1 | 95:5 MgCd[1]+Al | .0005 | .0005 | .0005 | .0005 | .0005 | .0005 |
| 2 | 76:24 MgCd[1]+Al | .0002 | .0002 | .0008 | .0010 | .0010 | .0015 |
| 3 | 53:47 MgCd[1]+Al | .0002 | .0002 | .0002 | .0002 | .0002 | .0002 |
| 4 | 35:65 MgCd[1]+Al | .0002 | .0002 | .0002 | .0002 | .0002 | .0002 |
| 5 | Cd+Al | .0002 | .0002 | .0002 | .0002 | .0002 | .0002 |
| 600° F. | | | | | | | |
| 6 | 95:5 MgCd[1]+Al | .0004 | .0007 | .0009 | | .0020 | .0025 |
| 7 | 76:24 MgCd[1]+Al | .0008 | | .0015 | .0020 | .0030 | .0040 |
| 8 | 67:33 MgCd[1]+Al | | | | | | .0025 |
| 9 | 53:47 MgCd[1]+Al | .0002 | .0002 | .0002 | .0002 | .0002 | .0002 |
| 10 | 35:65 MgCd[1]+Al | .0002 | .0002 | .0002 | .0002 | .0002 | .0002 |
| 11 | Cd+Al | .0002 | .0002 | .0002 | .0002 | .0002 | .0002 |

[1] Expressed in atomic percent.

The ductility of a number of these couples, as shown by minimum bend radius, also was measured at room temperature and 600° F. after the couples had been annealed for 24 hours at 600° F. Table III presents the results of these tests.

*Table III*

| Run No. | Composite Laminate | Test Condition | |
|---|---|---|---|
| | | Room Temp. | 600° F. |
| 1 | Mg+95:5 MgCd+Al | 2.9–3.9t (Lost Bond) | 3.9t |
| 2 | Mg+88:12 MgCd+Al | 2.9–3.9t (Lost Bond) | 3.9t |
| 3 | Mg+79:21 MgCd+Al | 7.8–9.7t | 3.9t |
| 4 | Mg+53:47 MgCd+Al | 2.4–2.9t | 2.0t |

In a manner similar to that described for the foregoing examples, a 50–50 MgCd (atomic percent) alloy can be sprayed onto a magnesium sheet and 3S aluminum (nominal composition 1.2 percent Mn, balance Mg) then be bonded thereto. Likewise cadmium can be electrodeposited on a A.S.T.M designated ZE10A alloy magnesium core (nominal composition 1.2 weight percent zinc, 0.2 weight percent misch metal, balance magnesium). This composite can be heat treated to give a surface layer of magnesium-cadmium binary containing about 85 atomic percent cadmium and this then be clad with a commercial grade aluminum sheet. A high purity magnesium article can be dipped into a molten magnesium-cadmium alloy (containing about 60 atomic percent cadmium) and both sides of the article can then be clad with 53S aluminum (nominal composition 0.7 percent silicon, 1.3 percent magnesium, 0.25 percent chromium, balance aluminum).

Various modifications can be made in the present invention without departing from the spirit or scope thereof for it is understood that we limit ourselves only as defined in the appended claims.

We claim:

1. A composite fabrication comprising a magnesium base having a thin coating of a magnesium-cadmium binary alloy thereon, said binary alloy consisting essentially of from about 5 to about 90 atomic percent cadmium and balance magnesium, and a layer of aluminum bonded to said magnesium-cadmium coating.

2. The fabrication as defined in claim 1 wherein the magnesium base is a magnesium sheet.

3. The fabrication as defined in claim 1 wherein the coating of magnesium-cadmium binary of the magnesium base has a thickness of from about 0.001 to about 0.005 inch.

4. The fabrication as defined in claim 1 wherein the layer of aluminum is high purity aluminum.

5. A composite fabrication comprising a magnesium sheet, a thin layer of magnesium-cadmium binary alloy bonded to the surfaces of said magnesium sheet said magnesium-cadmium alloy consisting essentially of from about 20 to about 75 atomic percent cadmium and balance magnesium and an outer layer of aluminum bonded to said magnesium-cadmium layer.

6. The fabrication as defined in claim 5 where the magnesium-cadmium alloy contains about 50 atomic percent cadmium.

7. A method for cladding magnesium sheet with aluminum which comprises; heating to from 650 to about 900° F. said magnesium sheet and a sheet of a magnesium-cadmium alloy, said magnesium-cadmium alloy consisting essentially of from about 20 to about 75 atomic percent cadmium and balance magnesium, positioning the magnesium-cadmium sheet on top of said magnesium sheet, passing the so-positioned sheets through the rolls of a rolling mill thereby roll bonding said sheets together, heating to about 600° F. the bonded sheets and a sheet of aluminum, placing said aluminum sheet on top of the magnesium-magnesium cadmium composite and in contact with the magnesium cadmium face of said composite and passing the so-positioned sheets through the rolls of a rolling mill thereby providing an aluminum clad magnesium sheet.

References Cited in the file of this patent

UNITED STATES PATENTS

| | | |
|---|---|---|
| 1,594,061 | Jones | July 27, 1926 |
| 1,729,339 | Gann | Sept. 24, 1929 |
| 2,306,033 | Beck | Dec. 22, 1942 |
| 2,366,168 | Bakarian | Jan. 2, 1945 |
| 2,651,835 | Jackson | Sept. 15, 1953 |
| 2,881,514 | Drummond | Apr. 14, 1959 |

OTHER REFERENCES

Metals Handbook, published by American Society for Metals, 1948 edition, page 1188.